(12) United States Patent
Spagnolini et al.

(10) Patent No.: US 10,841,137 B2
(45) Date of Patent: Nov. 17, 2020

(54) ANALOG SIGNAL WIDTH MODULATOR APPARATUS WITH CLOSED LOOP CONFIGURATION

(71) Applicant: Politecnico Di Milano, Milan (IT)

(72) Inventors: Umberto Spagnolini, Milan (IT); Lorenzo Combi, Pescantina (IT)

(73) Assignee: POLITECNICO DI MILANO, Milan (IT)

( * ) Notice: Subject to any disclaimer, the term of this patent is extended or adjusted under 35 U.S.C. 154(b) by 332 days.

(21) Appl. No.: 16/075,997

(22) PCT Filed: Feb. 9, 2017

(86) PCT No.: PCT/EP2017/052815
§ 371 (c)(1),
(2) Date: Aug. 7, 2018

(87) PCT Pub. No.: WO2017/137473
PCT Pub. Date: Aug. 17, 2017

(65) Prior Publication Data
US 2020/0328917 A1 Oct. 15, 2020

(30) Foreign Application Priority Data
Feb. 11, 2016 (IT) ........................... ITUB2016A0679

(51) Int. Cl.
*H04L 25/49* (2006.01)
*H04W 88/08* (2009.01)

(52) U.S. Cl.
CPC ......... *H04L 25/4902* (2013.01); *H04W 88/08* (2013.01)

(58) Field of Classification Search
CPC ... H03F 1/3247; H04L 25/4902; H04W 88/08
See application file for complete search history.

(56) References Cited

U.S. PATENT DOCUMENTS

| 2007/0096812 A1* | 5/2007 | Lee .......................... H03F 1/52 |
| | | 330/251 |
| 2007/0183490 A1 | 8/2007 | Anderson et al. |
| 2016/0072454 A1* | 3/2016 | Chappaz ................. H03F 3/217 |
| | | 330/251 |

FOREIGN PATENT DOCUMENTS

EP          0890221 A1    1/1999

OTHER PUBLICATIONS

International Search Report and Written Opinion in PCT/EP2017/052815 dated Jun. 12, 2017.

(Continued)

*Primary Examiner* — Sung S Ahn
(74) *Attorney, Agent, or Firm* — Manelli Selter PLLC; Edward Stemberger (57) ABSTRACT

It is described a modulator apparatus (3) comprising: an input terminal (23) structured to receive an analog electrical signal (x(t)) having an information content to be transmitted; a loop filter structured to receive an error signal (ε(t) and provide a filtered signal (s(t)), the loop filter being configured to minimize said error signal (ε(t)); a modulator device (10) configured to module the filtered signal (s(t)) and provide a Pulse Width Modulated, PWM, signal (y(t)) to be transmitted including a plurality of pulses having corresponding widths correlated to non-quantized amplitudes of the filtered signal (s(t)); a first pulse width demodulator (11) configured to receive the PWM, signal (y(t)) and provide a demodulated signal (ŝ(t)) and a difference module (12) configured to receive the analog electrical signal (x(t)) and the demodulated signal (ŝ(t)) and provide the error signal (ε(t)).

14 Claims, 5 Drawing Sheets

(56) References Cited

OTHER PUBLICATIONS

Pizzinat et al., "Things You Should Know About Fronthaul", Journal of Lightwave Technology; vol. 33, No. 5, Mar. 1, 2015.
Van De Grijp et al., "Novel Electro-optical Feedback Ttechnique for Noise and Distortion Reduction in High-quality Analogue Optical Transmission of Video Signals," Electronics Letters, vol. 17, No. 11, pp. 361-362, May 28, 1981.
Wilson et al., "Optical Fiber Transmission of Multiplexed Video Signals Using Pulse-width Modulation," Journal of Optoelectronics, vol. 4, No. 1, pp. 3-17, 1989.
Zin et.al., "An Overview of Radio-over-fiber Network Technology", ICP, 2010.
Pizzinat et al., "Things You Should Know About Fronthaul", Orange Labs Networks, ECOC 2014.

\* cited by examiner

FIG. 7

ANALOG SIGNAL WIDTH MODULATOR APPARATUS WITH CLOSED LOOP CONFIGURATION

BACKGROUND

Technical Field

The present invention relates to signal processing; particularly, the present invention relates to analog signal width modulators employable in telecommunication systems.

Description of the Related Art

Among the telecommunication systems, cellular telecommunication systems are the example considered here that employ base stations providing a cell with the network coverage for digital transmission of voice, data and others information.

The base stations are provided with a remote unit, RU, connected via an optical fiber to a baseband unit, BBU. In the remote unit RU the signal received by an antenna is converted into a lower frequency signal after down-conversion and, after an analog-to-digital conversion, the digital converted copy of the signal is transmitted over the optical fiber towards the baseband unit, BBU. The digital optical signal received at the base band unit BBU is converted in electrical form and suitably processed for demodulation and information retrival. The communication between the remote unit RU and the baseband unit BBU is known as "front-hauling".

Document "Things you should know about fronthaul", A. Pizzinat et al., Journal of lightwave technology; Vol. 33, No. 5, Mar. 1, 2015 describes several optical solutions for digital front-hauling with several limitations in term of requested digital data rates.

The following documents describe transmission techniques over optical fibers:
1) A. Van De Grijp et al., "Novel electro-optical feedback technique for noise and distortion reduction in high-quality analogue optical transmission of video signals," Electronics Letters, vol. 17, no. 11, pp. 361-362, 1981.
2) B. Wilson and Z. Gassemlooy, "Optical fiber transmission of multiplexed video signals using pulse-width modulation," Journal of Optoelectronics, vol. 4, no. 1, pp. 3-17, 1989.
Document "An overview of radio-over-fiber network technology", A. M. Zin et. al.; ICP, 2010, describes an analog transmission over optical fiber.

The European Patent Application No. EP 0890221A1 of Risbo Lars and Andersen Hans, describes a method and a circuit for use in the correction of non-linearity and noise in the conversion of a Pulse Code Modulation signal into a Uniform Pulse Width Modulation signal.

BRIEF SUMMARY OF THE INVENTION

The Applicant notices that the known signal transmission techniques show limitations. As an example, the Applicant observes that the known front-hauling techniques show limitations on the required bit rate for the transmission over the optical fiber that largely increase the bandwidth of the signal or they need extremely accurate linearity and high performances of the optical components employed, such as the transmitting laser.

The Applicant found that a modulator apparatus configured to perform an analog pulse width modulation in a closed loop configuration allows addressing the limitations of the known techniques by ensuring satisfying transmission performances, such as noise-rejection capability.

According to a first aspect, the present invention relates to a modulator apparatus comprising an input terminal structured to receive an analog electrical signal (x(t)) having an information content to be transmitted and a modulator device; wherein the modulator device is configured to receive and modulate a filtered signal (s(t)) and provide a Pulse Width Modulated (PWM) signal (y(t)) including a plurality of pulses having corresponding widths correlated to non-quantized amplitudes of the filtered signal (s(t)), a first pulse width demodulator configured to receive the PWM signal (y(t)) and provide a demodulated signal (ŝ(t)), and a difference module configured to receive the analog electrical signal (x(t)) and the demodulated signal (ŝ(t)) and provide an error signal (ε(t)), a loop filter configured to receive said error signal (ε(t)) and provide said filtered signal (s(t)), the loop filter being configured to minimize said error signal (ε(t)).

The modulator device further comprises a comparator having a first terminal connected to the loop filter, a second terminal and an output terminal structured to provide the PWM signal (y(t)), a wave generator configured to provide a triangular wave (wt(t)) on the second terminal, the waive generator is configured to provide the triangular wave having frequency higher than the Nyquist frequency associated with the analog electrical signal.

According to an embodiment, the first terminal is directly connected to the loop filter to receive the filtered signal (ŝ(t)).

According to another embodiment, the modulator device includes a first sample-and-hold module connected between an output of the loop filter and the first terminal of the comparator, configured to provide a plurality of samples ($S_{SH}(k)$), representing the non-quantized amplitudes of the filtered signal (s(t)).

Moreover, the modulator apparatus comprises at least one further difference module configured to receive the analog electrical signal (x(t)) and the demodulated signal (ŝ(t)) and provide a further error signal, and at least one further loop filter configured to receive the further error signal and provide the analog electrical signal (x(t)).

Furthermore, the first pulse width demodulator comprises an integrate-and-dump module configured to receive the PWM signal (y(t)) and generate an intermediate demodulated signal, and a second sample-and-hold module configured to receive the intermediate demodulated signal and provide the demodulated signal (ŝ(t)).

According to a second aspect, the present invention relates to a cellular base station comprising at least one antenna configured to receive a radio signal and provide an electrical signal (X(t)), a frequency conversion module configured to receive the electrical signal (X(t)) and provide an analog electrical signal (x(t)), a modulator apparatus according to the present disclosure wherein the input terminal is configured to receive to the analog electrical signal (x(t)) provided by the frequency conversion module.

According to an embodiment, the cellular base station further comprises an electrical to optical converter configured to generate an optical signal from the PWM signal (y(t)), an optical fiber having a first port connected to an output of the electrical-to-optical converter and configured to propagate said optical signal, an optical-to-electrical converter connected to a second port of the optical fiber and configured to generate a PWM received signal ((y_R(t)), a demodulator configured to demodulate the PWM received signal (($y_R(t)$)) and provide a digital signal ($DS_x$) comprising the information content of the analog electrical signal ($x(t)$).

According to another embodiment, the demodulator of the cellular base station comprises a second pulse width demodulator configured to receive the PWM received signal (($y_R(t)$)) and provide a discrete-time analog signal ($\hat{x}_k$), a decimation module configured to receive the discrete-time analog signal ($\hat{x}_k$) and provide a corresponding plurality of samples ($\hat{x}_l$) generated at the Nyquist frequency associated with the analog electrical signal ($x(t)$), a quantization module configured to receive the plurality of samples ($\hat{x}_l$) and provide the digital signal ($DS_x$).

Further, the demodulator comprises a further integrate-and-dump module configured to receive the PWM received signal (($y_R(t)$)) and provide an analog signal, an analog-to-digital converter configured to receive the analog signal and provide a digitized signal, a respective digital signal processing module configured to receive the digitized signal and provide a further digital signal having the Nyquist frequency associated with said analog electrical signal ($x(t)$).

In accordance with a further aspect, an amplifier circuit comprising a modulator apparatus and a Class-D switching stage having an input connected to the modulator apparatus to receive the PWM signal ($y(t)$) and an output configured to provide an amplified filter (202) configured to filter the amplified signal $y_A(t)$ and provide an amplified filtered signal ($y_F(t)$).

According to one embodiment, the analog electrical signal ($x(t)$) is an audio-frequency signal and the filter is a low-pass filter.

According to another embodiment, the amplifier circuit further comprises a loudspeaker configured to convert the amplified filtered signal ($y_F(t)$) into an acoustic signal ($y_F(t)$).

According to an embodiment, the analog electrical signal ($x(t)$) is a narrowband radio-frequency signal and the filter is a band-pass filter.

BRIEF DESCRIPTION OF THE DRAWINGS

Further characteristics and advantages will be more apparent from the following description of a preferred embodiment and of its alternatives given as a way of example with reference to the enclosed drawings in which.

DETAILED DESCRIPTION

Analogous or identical modules and components are indicated in the figures with the same reference numbers. It is observed that in the following description embodiments of a modulator apparatus 3 will be described with reference to a particular application in a cellular base station, but such modulator apparatus 3 can be also employed in other types of telecommunication systems for transport of analog signals.

Figure 1:
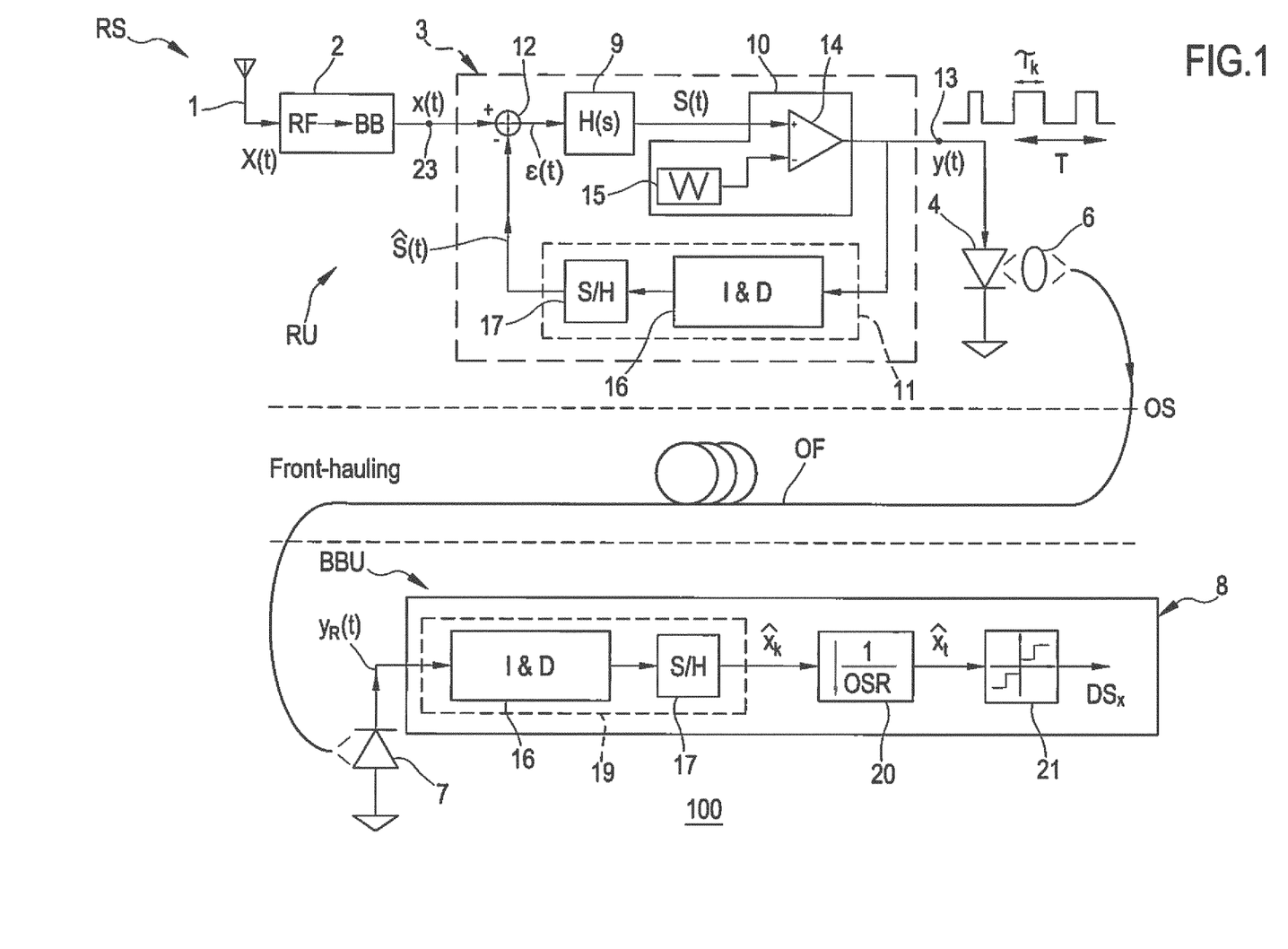
FIG. 1 shows an embodiment of a cellular base station including a modulator apparatus, a fiber optic and a demodulator module.

FIG. 1 shows an embodiment of a cellular base station 100 of a cellular telecommunication system. Particularly, the cellular base station 100 can be included in a radio access network, RAN, and more particularly in a Centralized RAN operating in a cellular telecommunication system, as an example, of the $4^{th}$ Generation or of the future $5^{th}$ Generation wireless systems.

In accordance with the embodiment of FIG. 1 the cellular base station 100 comprises a remote unit RU, an optical fiber OF (implementing a front-hauling connection) and a base band unit BBU. The remote unit RU comprises: at least one antenna 1, a frequency conversion module 2, the above mentioned modulator apparatus 3 and an electrical-to-optical converter 4, coupled with an input port of the optical fiber OF by means, as an example, of a coupling device 6. According to one embodiment the frequency conversion module 2 is a radio frequency to base band conversion module that, for instance, translates the radio frequency signal into a lower frequency with the same bandwidth.

The base band unit BBU comprises: an optical-to-electrical converter 7 coupled to the optical fiber OF and a demodulator 8.

The antenna 1 is configured to receive a radio signal RS and provide an electrical signal $X(t)$. As an example, the radio signal RS is modulated according to a QAM (Quadrature Amplitude Modulation) technique. The radio frequency to base band conversion module 2 is configured to receive the electrical signal $X(t)$ and provide a lower frequency such as a base band analog electrical signal $x(t)$ to an input terminal 23 of the modulator apparatus 3. As an example, the base band analog electrical signal $x(t)$ (hereinafter, also called analog electrical signal) shows a limited bandwidth that can be lower than 10 MHz or lower than 20 MHz, the bandwidth limit depends on the specific technological implementation. With reference to LTE (Long Term Evolution) signals, the employed band can be: 1.4 MHz, 3 MHz; 5 MHz, 10 MHz, 15 MHz or 20 MHz. Evolved LTE signals can aggregate multiple bands to form a new signal $x(t)$ that is always bandlimited.

According to the particular embodiment of FIG. 1, the modulator apparatus 3 comprises: a loop filter 9, a modulator device 10, a first pulse width demodulator 11 and a difference module 12. The loop filter 9 is configured to receive an error signal $\varepsilon(t)$ and provide a filtered signal $s(t)$. The modulator device 10 is configured to modulate the filtered signal $s(t)$ according to a Pulse Width Modulation technique and provide a PWM signal $y(t)$ on an output terminal 13.

The PWM signal $y(t)$ is known to an expert skilled in the art and it includes a plurality of pulses having a corresponding plurality of widths correlated to non-quantized amplitudes of the filtered signal $s(t)$. The first pulse width demodulator 11 is configured to receive the PWM signal $y(t)$ and provide a first demodulated signal $\hat{s}(t)$. The difference module 12 is configured to receive the analog electrical signal $x(t)$ and the first demodulated signal $\hat{s}(t)$ and provide the error signal $\varepsilon(t)$, as difference of said analog signals.

Figure 2:
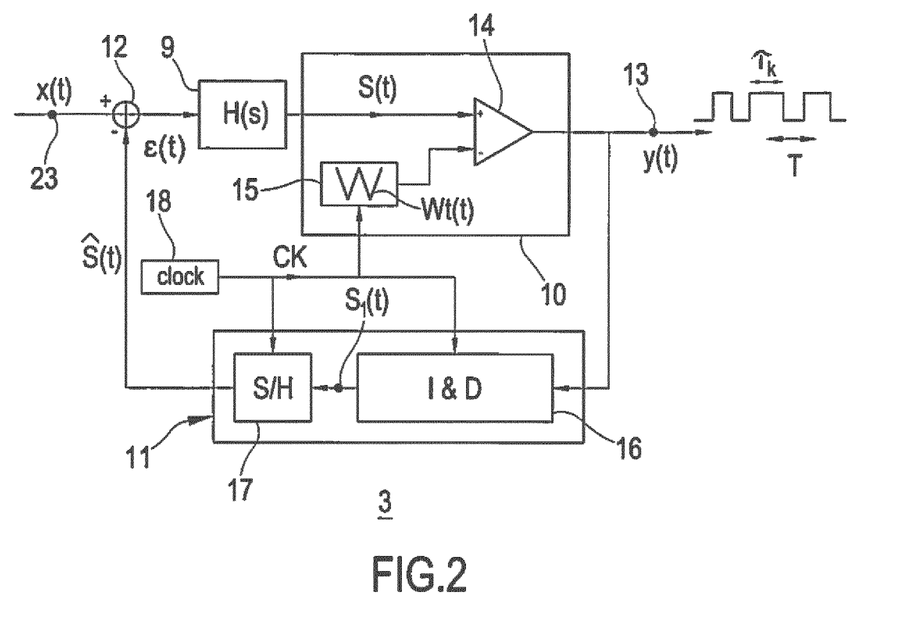
FIG. 2 shows a first embodiment of said modulator apparatus employing a modulator device configured to perform a pulse with modulation according to a first example.

FIG. 2 shows a particular embodiment of the modulator apparatus 3. As an example, the loop filter 9 is an analog filter and can be an integrator which can be implemented by an resistor-capacitor, RC, electronic circuit.

The modulator device 10 can be a known PWM modulator and it comprises, according to the first embodiment of FIG. 2, a comparator 14 and a wave generator 15. The modulator device 10 has a first terminal (e.g. a non-inverting terminal "+") connected to the loop filter 9, a second terminal (e.g. the inverting terminal "−") connected to the wave generator 15 and an output connected to the output terminal 13 to provide the PWM signal y(t). The wave generator 15 is configured to provide a triangular wave wt(t) on said second terminal (−) having frequency higher than the Nyquist frequency associated with said analog electrical signal x(t).

The PWM signal y(t), shown in FIG. 2, is a train of pulses having a period T corresponding to the period of the triangular wave wt(t) generated by the wave generator 15 and width $\tau_k$ correlated to the an instantaneous sample amplitude of the filtered signal s(t). The PWM signal y(t) is a two-level signal (e.g. having levels 0, 1) while the widths $\tau_k$ can assume every value between 0 and T corresponding to a minimum and a maximum amplitude of the filtered signal s(t). It is observed that the PWM signal y(t) is an analog signal.

Figure 3:
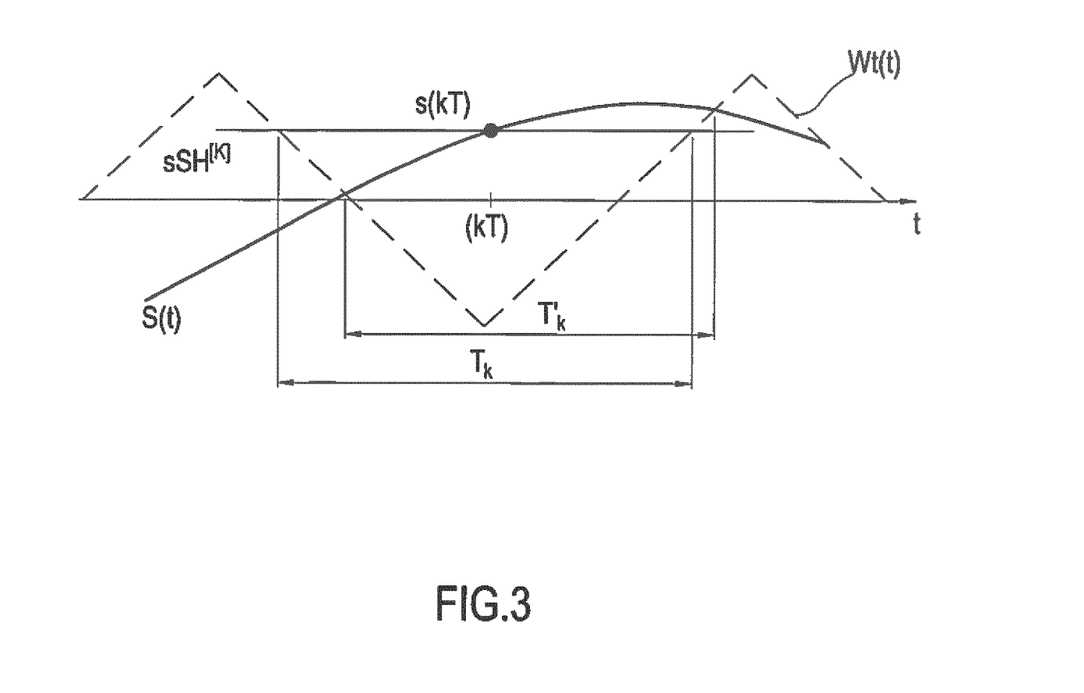
FIG. 3 shows signal behaviours with reference to two possible implementations of pulse width modulation performed by said modulator device.

FIG. 3 shows the intersections of the filtered signal s(t) with the triangular wave wt(t) with the consequent determination of the pulse width $\tau'_k$, so showing the operation of the modulator device 10 according to the embodiment of the FIG. 2. It is observed that the modulator device 10 performs an implicit sampling of the filtered signal s (t) according to a sampling frequency higher than the Nyquist frequency associated with said analog electrical signal x(t), so obtaining an oversampling filtered signal s(t).

The first pulse width demodulator 11 can be a known PWM demodulator and it comprises an integrate-and-dump module 16 (I&D) and a sample-and-hold module 17 (S/H). The integrate-and-dump module 16 is configured to receive the analog PWM signal y(t) and generate an intermediate demodulated signal $s_1(t)$. The sample-and-hold module 17 is configured to receive the intermediate demodulated signal $s_1(t)$ and provide the first demodulated signal $\hat{s}(t)$. The first demodulated signal $\hat{s}(t)$ is an analogical signal showing amplitudes proportional to the widths of the PWM signal y(t).

A clock generator 18 provides a clock signal CK to the modulator device 10 and the first pulse width demodulator 11, to operate synchronously.

The difference module 12 is a node performing the difference between the analog electrical signal x(t) and the first demodulated signal $\hat{s}(t)$ providing the error signal ε(t).

The loop filter 9 is designed to minimize the error signal ε(t)=x(t)−$\hat{s}(t)$, so obtaining that the first demodulated signal $\hat{s}(t)$ is a prediction of the analog electrical signal x(t). The loop filter 9 is designed to attenuate within the bandwidth of the analog electrical signal x(t) any noise introduced by the modulator device 10, which can be due to a noise of the clock signal CK and/or inaccuracies of the comparator 14 (e.g. finite slew rate) and/or the imperfections of the electronic components. This result is obtained thanks to the oversampling performed by the modulator device 10. As an example, the following values of the oversampling ratio OSR can be employed: 4, 6 and 8.

It is noticed that the modulator apparatus 3 allows performing a noise shaping having performances dependent on the order of the loop filter 9 and on the oversampling ratio.

The transfer function expressed in the Laplace domain of the loop filter 9 is indicated with H(s); the transfer function (expressed into the Z domain) of the modulator apparatus 3, between the input terminal 23 and the output terminal 13, is indicated as STF(z) (Signal Transfer Function); the transfer function (expressed into the Z domain) relating to the noise introduced by the modulator device 10 is indicated as NTF(z) (Noise Transfer Function).

Table 1 shows two examples of possible forms of the above defined transfer functions H(s), STF(z) and NTF(z).

TABLE 1

| Order | H(s) | NTF(z) | STF(z) |
|---|---|---|---|
| 1 | 1/s | $1 - z^{-1}$ | $z^{-1}$ |
| 2 | $(1 - 2Ts)/s^2$ | $(1 - z^{-1})^2$ | 1 |

When the loop filter 9 is a first order integrator (1/s), the NTF(z) is a high pass transfer function and the STF is a simple delay.

When the loop filter 9 is a second order integrator, the NTF(z) is a high pass transfer function showing higher gain at higher frequencies and a higher attenuation at low frequencies with respect to the previous case, the STF is a unit.

Figure 4:
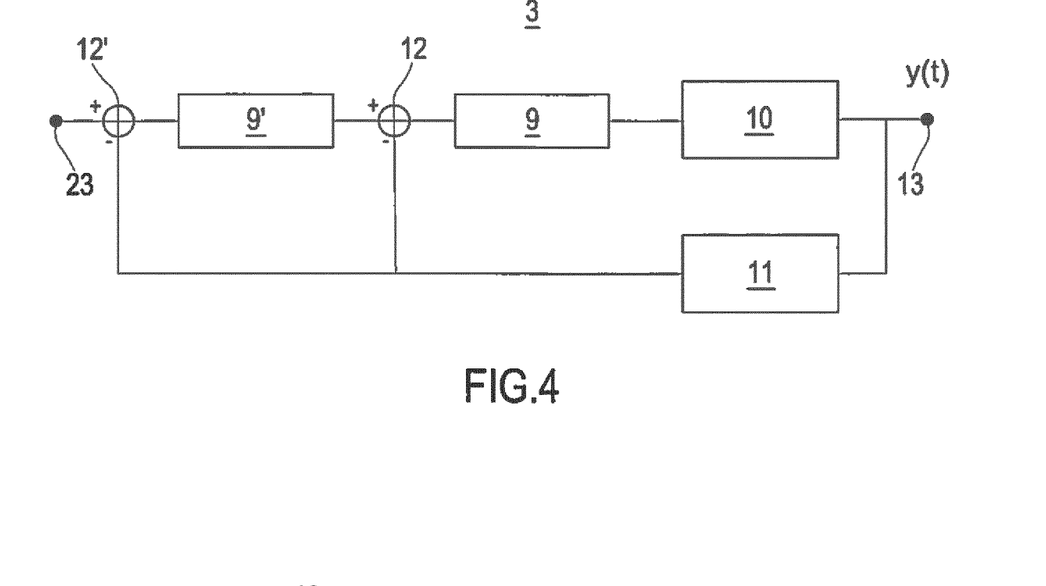
FIG. 4 shows a second embodiment of the modulator apparatus employing more than one loop filter.

According to another embodiment, the second order behaviour can be obtained also by employing a modulator apparatus 3 as shown in FIG. 4, wherein a further loop filter 9' and a further difference module 12' are employed. In this case the loop filter 9 and the further loop filter 9' are first order integrators.

With reference to a comparison between the solution employing a loop filter 9 of the first order and the one of the second order, the following expressions can be useful:

$$\sigma^2_{\delta\tau,1} = 2\sigma^2_{\Delta\tau}\left(1 - \frac{\sin\xi}{\xi}\right)$$

$$\sigma^2_{\delta\tau,2} = \sigma^2_{\Delta\tau}\left(6 - 8\frac{\sin\xi}{\xi} + \frac{\sin 2\xi}{\xi}\right)$$

Wherein:
$\sigma^2_{\Delta\tau}$ is the power of the noise introduced at the modulator device 10;
$\sigma^2_{\delta_{\tau,1}}$ is the power of the noise in the band of the analog electrical signal x(t) at the output terminal 13, when a loop filter 9 of the first order is employed;
$\sigma^2_{\delta_{\tau,2}}$ is the power of the noise in the band of the analog electrical signal x(t) at the output terminal 13, when a loop filter 9 of the second order is employed;
ξ=π/OSR; where OSR is the oversampling ratio.

As an example, using an oversampling ratio OSR=4; the noise power $\sigma^2_{\delta_{\tau,1}}$ is attenuated of a factor 5, and the noise power $\sigma^2_{\delta_{\tau,2}}$ is attenuated of a factor 14.

With reference to FIG. 1, the electrical-to-optical converter 4 can be, as an example, a laser, particularly, a laser DFB (Distributed Feedback) or a VCSEL (Vertical Cavity Surface emitting Laser). The electrical-to-optical converter 4 can be directly modulated by the PWM signal y(t) or an optical radiation produced by the electrical-to-optical converter 4 can be modulated by a suitable optical modulator according to the PWM signal y(t). The electrical-to-optical converter 4 is configured to transmit a PWM optical signal OS over the optical fiber OF.

The optical fiber OF can be a standard single mode fiber (SSMF). The optical-to-electrical converter 7 can be a photodiode, such as an example, a PIN photodiode or an APD (Avalanche Photodiode). The optical-to-electrical converter 7 is configured to convert the received PWM optical signal OS into a received PWM electric signal $y_R(t)$.

The demodulator 8 comprises a second pulse width demodulator 19 structurally analogue or identical to the first pulse width demodulator 11 and comprising a further integrate-and-dump module 16 and a further sample-and-hold module 17.

The second pulse width demodulator 19 is configured to demodulate the received PWM electric signal $y_R(t)$ providing a second demodulated signal $\hat{x}_k$. The second demodulated signal $\hat{x}_k$ is an analog signal representing the analog electrical signal x(t) sampled at the same sampling frequency of the PWM signal y(t).

According to an example, the demodulator 8 further comprises a decimator 20 and a quantizer 21. The decimator 20 is configured to eliminate from the second demodulated signal $\hat{x}_k$ the oversampling and produce decimated signal samples $\hat{x}_l$ at the Nyquist frequency of the analog electrical signal x(t). As an example, the decimator 20 is the series of a low pass filter and a down-sampler.

The quantizer 21 is configured to produce from the decimated signal samples $\hat{x}_l$ a digital signal $DS_x$ comprising the information content of said analog electrical signal x(t).

In accordance with another example, the demodulator 8 can comprise an analog-to-digital converter (not shown), placed at the output of the further integrate- and dump-module 16 included into the demodulator 8, which provides a digitized signal. In this case, all the filtering steps (e.g. the steps performed by the decimator 20 and the quantizer 21 of FIG. 1) can be performed on the digitized signal by a respective digital signal processing module.

The operation of the cellular base band unit 100 is now described with reference to the upstream transmission but similar description is for downstream. The radio signal RS is received at the antenna 1 and converted into the electrical signal X(t). The frequency conversion module 2 converts the electrical signal X(t) into the analog electrical signal x(t) which is fed to the modulator apparatus 3.

The modulator apparatus 3 produces the PWM signal y(t) which is converted into the PWM optical signal OS, by the electrical-to-optical converter 4. The PWM optical signal OS propagates along the optical fiber OF and reaches the optical-to-electrical converter 7 which converts it into the received PWM electric signal $y_R(t)$. The second pulse width demodulator 19 demodulates the PWM electric signal $y_R(t)$ providing the second demodulated signal $\hat{x}_k$. The decimator 20 eliminates from the second demodulated signal $\hat{x}_k$ the oversampling and produces the decimated signal samples $\hat{x}_l$. The quantizer 21 generates from the decimated signal samples $\hat{x}_l$ the digital signal $DS_x$.

The digital signal $DS_x$ is so available be sent over a back-haul network of the network operator. As an example, the digital signal $DS_x$ is processed by a digital signal processing unit (not shown) which performs demodulation and processing according to specific communication protocols. As an example, digital signal processing unit performs demodulation of LTE signals and processing according to MAC (Medium Access Control) level protocol.

The described solution shows several advantages. It is noticed that the PWM optical signal OS is an analog signal and therefore the bandwidth expansion required for a digital optical signal is avoided. This allows employing the optical fiber OF to serve multiple antennas or signals with larger bandwidth. If more than one antenna 1 is used, each antenna is connected to a corresponding radio frequency to lower frequency or base band conversion module 2 having respective outputs connected to a multiplexer coupled with the input terminal 23 of the modulator apparatus 3.

Moreover, it is noticed the PWM optical signal OS is a two-level signal and so the linearity requirements for the optical components (laser 4 and photodiode 7) are relaxed; particularly, the laser 4 and the photodiode 7 can operate in saturation conditions with complexity saving. The use of a PWM optical signal on the optical fiber OF reduces the impact of the zero-mean optical noise.

In addition, the closed loop configuration of the modulator apparatus 3 reduces the error introduced by the modulator device 10.

The use of the modulator device 10 which performs an analog PWM modulation, without quantization of the filtered signal s(t), avoids the introduction of quantization noise.

Figure 5:
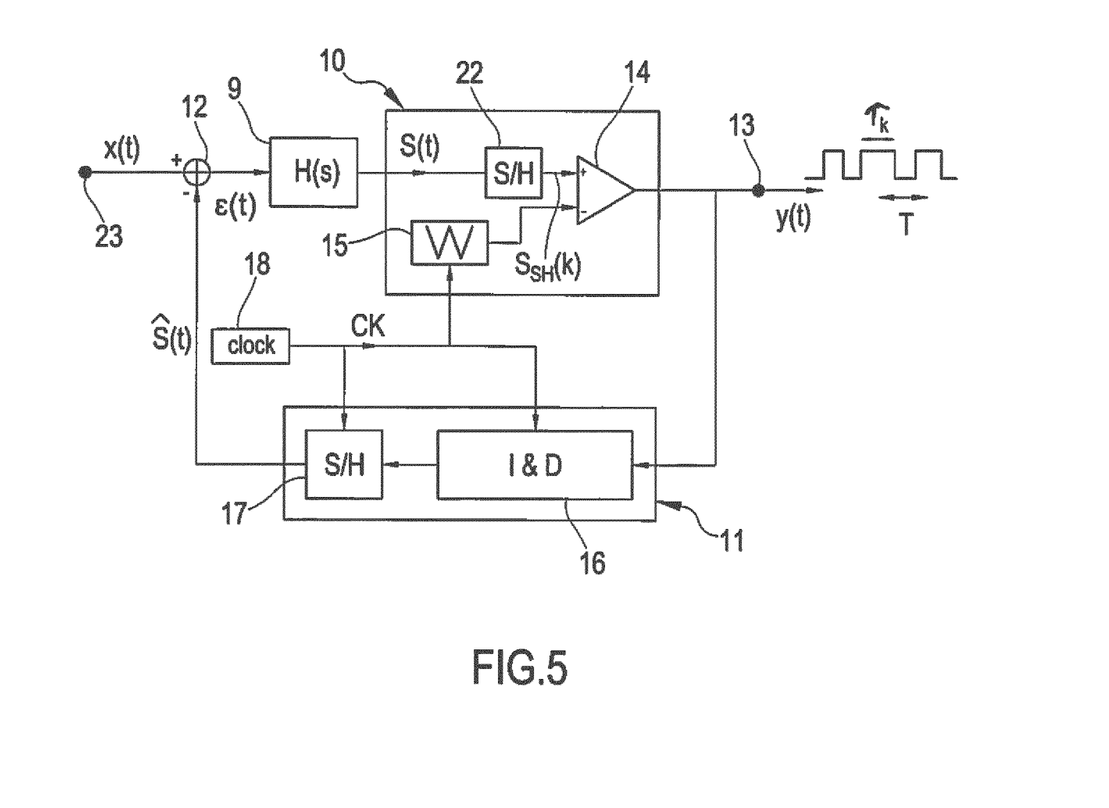
FIG. 5 shows a third embodiment of the modulator apparatus configured to perform a pulse with modulation according to a second example.

According to a third embodiment shown in FIG. 5, the modulator apparatus 3 comprises a modulator device 10 including a further sample-and-hold module 22 placed between the output of the loop filter 9 and the first terminal (−) of the comparator 14. The further sample-and-hold module 22 produces from the filtered signal s(t) its discrete-time version, i.e. the sampled signal $S_{SH}(k)$, sampled at the PWM frequency. The modulator device 10 provided with the further sample-and-hold module 22 is a conventional PWM modulator.

FIG. 3 shows the intersection of the sampled signal $S_{SH}(k)$ with the triangular wave wt(t) and the consequent determination of the pulse width $\tau_k$, so showing the operation of the modulator device 10 according to this example.

Moreover, according to another embodiment, the frequency conversion module 2 (FIG. 1) is configured to convert the electrical signal X(t) from the radio frequency to an intermediate frequency (i.e. the module 2 does not perform base band conversion). In this case, the loop filter 9 is analogue to the one described above but it is also designed to perform a band pass filtering, so as to obtain a corresponding PWM signal y(t) having the same content of the electrical signal X(t).

With reference to another embodiment, the PWM signal y(t) can be transmitted not only along an optical fiber (after electrical-to optical conversion) but it can be transmitted also along another type of guided transmission media, such as an example, a twisted pair cable.

Figure 6:
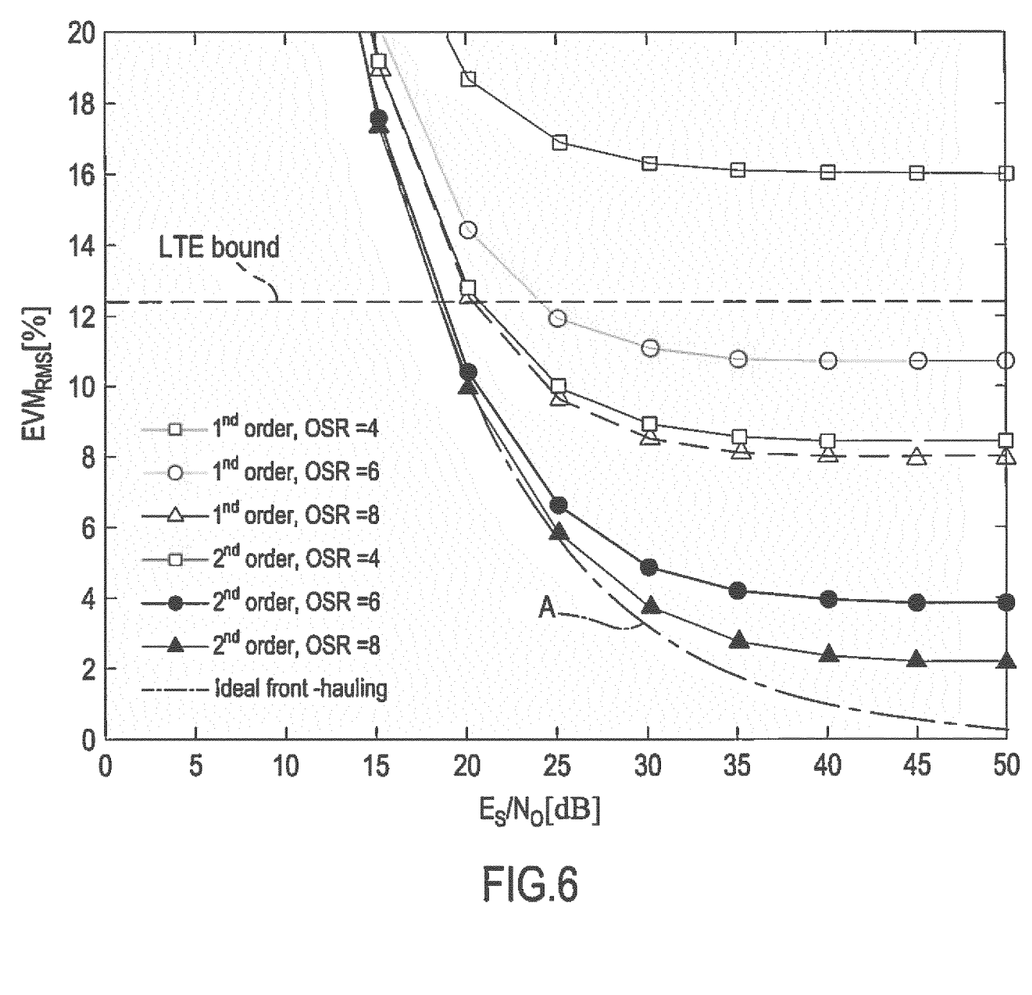
FIG. 6 shows results of software simulations of said modulator apparatus.

The applicant has performed software simulations to evaluate the performances of the modulator apparatus 3 of FIG. 2. Particularly, in FIG. 6 the behaviour of the EVM (Error Vector Magnitude), expressed as Root Mean Square, versus the signal-to-noise ratio $E_s/N_0$ of the radio link has been analysed, by varying the OSR and the order of the loop filter 9. The line "LTE bound" represents the limit allowed by the LTE standard for 16-QAM radio signals. The curve A in FIG. 6 represents the ideal behaviour (i.e. absence of errors from the antenna 1 to the output of the demodulator 8). It is observed that for most parameter values the EVM curves are below the limit for LTE.

It is observed that the modulator apparatus 3 does not show the distortions arising from imprecision that occurs in the conventional PWM modulators.

Figure 7:
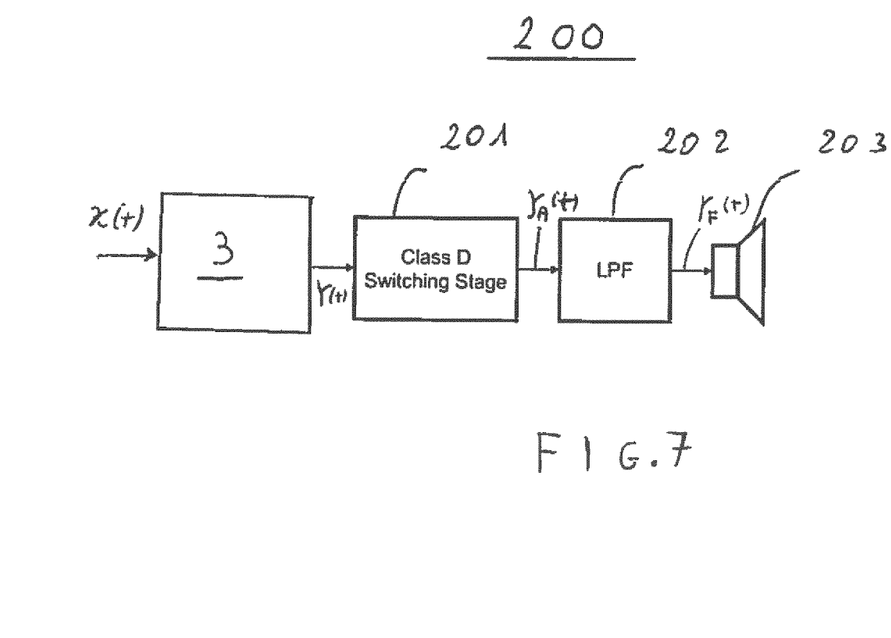
FIG. 7 schematically shows a Class-D amplifier employing said modulator apparatus.

The modulator apparatus 3 can be employed in a switching amplifier such as Class-D amplifier, for example in audio equipments. FIG. 7 schematically shows a Class-D audio amplifier 200 comprising the modulator apparatus 3, which drives a Class-D switching stage 201 (i.e., an amplification stage) having an output connected to a filter 202 that, for audio equipments, is a low-pass filter 202. As shown in FIG. 7, an output of the filter 202 is the recovered precise and amplified analog signal that can be connected to a loudspeaker 203. Particularly, the analog electrical signal x(t)

supplied to the modulator apparatus 3 is an audio-frequency signal. The PWM signal y(t) on an output terminal 13 is supplied to the Class-D switching stage 201 and its output amplified signal $y_A(t)$ is fed to the filter 202. The filter (202) is configured to filter said amplified signal providing an amplified filtered signal $y_F(t)$. The loudspeaker (203) is configured to convert said filtered signal $y_F(t)$ into an acoustic signal.

Thanks to the modulator apparatus 3, which is a very precise PWM generation module, an energy efficiency beyond 90% can be obtained in signal amplification: so the Class-D amplifier 200 can be also employed in high-end applications where signal quality and energy usage is a key performance indicator.

The above described modulator apparatus 3 can be used in any further context where precise PWM substitutes the analog signal such as the following exemplifying contexts: PWM communication on optical fiber, PWM communication for power line systems, PWM driving of Class-D amplifiers such as an example, those routinely employed in commercial audio equipment or high-quality audio systems and loudspeaker arrays in MEMS (Microelectromechanical systems), PWM driving of saturating radiofrequency switching amplifiers where filters are pass-band filters for the specific operating narrowband signals.

The invention claimed is:

1. A modulator apparatus comprising:
    an input terminal structured to receive an analog electrical signal (x(t)) having an information content to be transmitted;
    a loop filter structured to receive an error signal (ε(t)) and provide a filtered signal (s(t)), the loop filter being configured to minimize said error signal (ε(t));
    a modulator device configured to modulate the filtered signal (s(t)) and provide a Pulse Width Modulated, PWM, signal (y(t)) including a plurality of pulses having corresponding widths correlated to non-quantized amplitudes of the filtered signal (s(t));
    a first pulse width demodulator configured to receive the PWM signal (y(t)) and provide a demodulated signal (ŝ(t)); and
    a difference module configured to receive the analog electrical signal (x(t)) and the demodulated signal (ŝ(t)) and provide an error signal (ε(t)).

2. The modulator apparatus of claim 1, wherein the modulator device comprises:
    a comparator having a first terminal connected to the loop filter, a second terminal and an output terminal structured to provide the PWM signal (y(t));
    a wave generator configured to provide a triangular wave (wt(t)) on said second terminal; said waive generator is configured to provide the triangular wave having frequency higher than the Nyquist frequency associated with said analog electrical signal.

3. The modulator apparatus of claim 2, wherein said first terminal is directly connected to said loop filter to receive the filtered signal ((ŝ(t)).

4. The modulator apparatus of claim 2, wherein the modulator device includes:
    a first sample-and-hold module connected between an output of the loop filter and the first terminal of the comparator, configured to provide a plurality of samples ($S_{SH}(k)$), representing the non-quantized amplitudes of the filtered signal (s(t)).

5. The modulator apparatus of claim 1, further comprising:
    at least one further difference module configured to receive the analog electrical signal (x(t)) and the demodulated signal (ŝ(t)) and provide a further error signal;
    at least one further loop filter configured to receive the further error signal and provide the analog electrical signal (x(t)).

6. The modulator apparatus of claim 1, wherein the first pulse width demodulator comprises:
    an integrate-and-dump module configured to receive the PWM signal (y(t)) and generate an intermediate demodulated signal,
    a second sample-and-hold module configured to receive the intermediate demodulated signal and provide said demodulated signal (ŝ(t)).

7. A cellular base station comprising:
    at least one antenna configured to receive a radio signal (RS) and provide an electrical signal (X(t));
    a frequency conversion module configured to receive the electrical signal (X(t)) and provide an analog electrical signal (x(t));
    a modulator apparatus comprising:
        an input terminal structured to receive an analog electrical signal (x(t)) having an information content to be transmitted;
        a loop filter structured to receive an error signal (ε(t)) and provide a filtered signal (s(t)), the loop filter being configured to minimize said error signal (ε(t));
        a modulator device configured to modulate the filtered signal (s(t)) and provide a Pulse Width Modulated, PWM, signal (y(t)) including a plurality of pulses having corresponding widths correlated to non-quantized amplitudes of the filtered signal (s(t));
        a first pulse width demodulator configured to receive the PWM signal (y(t)) and provide a demodulated signal (ŝ(t)); and
        a difference module configured to receive the analog electrical signal (x(t)) and the demodulated signal (ŝ(t)) and provide an error signal (ε(t)),
    wherein the input terminal is configured to receive to the analog electrical signal (x(t)) provided by the frequency conversion module.

8. The cellular base station of claim 7, further comprising
    an electrical to optical converter configured to generate an optical signal from said PWM signal (y(t));
    an optical fiber having a first port connected to an output of the electrical-to-optical converter and configured to propagate said optical signal;
    an optical-to-electrical converter connected to a second port of the optical fiber and configured to generate a PWM received signal (($y_R(t)$));
    a demodulator configured to demodulate the PWM received signal (($y_R(t)$)) and provide a digital signal comprising the information content of said analog electrical signal (x(t)).

9. The cellular base station according to claim 8, wherein the demodulator comprises:
    a second pulse width demodulator configured to receive the PWM received signal (($y_R(t)$)) and provide a discrete-time analog signal ($\hat{x}_k$);
    a decimation module configured to receive the discrete-time analog signal ($\hat{x}_k$) and provide a corresponding plurality of samples ($\hat{x}_l$) generated at the Nyquist frequency associated with said analog electrical signal (x(t));
    a quantization module configured to receive the plurality of samples ($\hat{x}_l$) and provide the digital signal.

10. The cellular base station according to claim 8, wherein the demodulator comprises:
a further integrate-and-dump module configured to receive the PWM received signal (($y_R(t)$)) and provide an analog signal,
an analog-to-digital converter configured to receive the analog signal and provide a digitized signal;
a respective digital signal processing module configured to receive the digitized signal and provide a further digital signal having the Nyquist frequency associated with said analog electrical signal ($x(t)$).

11. An amplifier circuit, comprising:
modulator apparatus comprising:
an input terminal structured to receive an analog electrical signal ($x(t)$) having an information content to be transmitted;
a loop filter structured to receive an error signal ($\varepsilon(t)$) and provide a filtered signal ($s(t)$), the loop filter being configured to minimize said error signal ($\varepsilon(t)$);
a modulator device configured to modulate the filtered signal ($s(t)$) and provide a Pulse Width Modulated, PWM, signal ($y(t)$) including a plurality of pulses having corresponding widths correlated to non-quantized amplitudes of the filtered signal ($s(t)$);
a first pulse width demodulator configured to receive the PWM signal ($y(t)$) and provide a demodulated signal ($\hat{s}(t)$); and
a difference module configured to receive the analog electrical signal ($x(t)$) and the demodulated signal ($\hat{s}(t)$) and provide an error signal ($\varepsilon(t)$);
a Class-D switching stage having an input connected to the modulator apparatus to receive said PWM signal ($y(t)$) and an output configured to provide an amplified signal ($y_A(t)$);
a filter configured to filter said amplified signal $y_A(t)$ and provide an amplified filtered signal ($y_F(t)$).

12. The amplifier circuit of claim 11, wherein said analog electrical signal ($x(t)$) is an audio-frequency signal and the filter is a low-pass filter.

13. The amplifier circuit of claim 12, further comprising a loudspeaker configured to convert said amplified filtered signal ($y_F(t)$) into an acoustic signal ($y_F(t)$).

14. The amplifier circuit of claim 11, wherein the said analog electrical signal ($x(t)$) is a narrowband radio-frequency signal and the filter is a band-pass filter.

* * * * *